United States Patent
McEvoy et al.

(10) Patent No.: US 9,395,002 B2
(45) Date of Patent: Jul. 19, 2016

(54) PRESSURE EQUALIZING VALVE

(71) Applicant: GE Oil & Gas Pressure Control LP, Houston, TX (US)

(72) Inventors: Travis Kyle McEvoy, Houston, TX (US); David Daniel Comeaux, Houston, TX (US); Lloyd Ray Cheatham, Lake Jackson, TX (US); Edward York, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 248 days.

(21) Appl. No.: 14/035,483

(22) Filed: Sep. 24, 2013

(65) Prior Publication Data

US 2015/0083954 A1    Mar. 26, 2015

(51) Int. Cl.
*F16K 3/02* (2006.01)
*F16K 39/04* (2006.01)
*E21B 34/10* (2006.01)

(52) U.S. Cl.
CPC .............. *F16K 3/02* (2013.01); *E21B 34/101* (2013.01); *F16K 39/04* (2013.01)

(58) Field of Classification Search
CPC .......... F16K 3/34; F16K 39/024; F16K 39/04
USPC ................. 137/630.12, 630.15; 251/282, 328
See application file for complete search history.

(56) References Cited

U.S. PATENT DOCUMENTS

| 1,932,471 | A | * | 10/1933 | McKellar | 137/630.12 |
| 4,678,008 | A | * | 7/1987 | Gyongyossy | 137/630.12 |
| 5,199,683 | A | * | 4/1993 | Le | 251/1.3 |
| 5,370,155 | A | * | 12/1994 | Gyongyossy | 137/630.12 |
| 8,302,630 | B2 | | 11/2012 | Palmer | |
| 2009/0256099 | A1 | * | 10/2009 | Palmer | F16K 3/0209 251/326 |
| 2013/0056670 | A1 | | 3/2013 | Palmer | |
| 2013/0263954 | A1 | * | 10/2013 | McBride | 137/630.12 |

FOREIGN PATENT DOCUMENTS

FR           368879 A      12/1906
WO   PCT/US98/15817      2/1999

OTHER PUBLICATIONS

International Search Report and Written Opinion issued in connection with corresponding PCT Application No. PCT/US2014/055375 on Dec. 16, 2014.

* cited by examiner

Primary Examiner — John K Fristoe, Jr.
Assistant Examiner — Paul Gray
(74) Attorney, Agent, or Firm — Bracewell LLP (57) ABSTRACT

A gate valve includes a body with a flow passage intersected by a gate cavity and a gate with an axis, the gate being axially movable in the gate cavity between a gate closed position and a gate open position. A lifting device is in engagement with a stem of the gate to move the gate to the gate open position. A port extends from a first external surface of the gate to a second external surface of the gate. A seal member is mechanically connected to the lifting device, the seal member being moveable in response to axial movement of the lifting device between a seal open position where fluids can flow through the port and a seal closed position where the seal member blocks fluids from flowing through the port.

20 Claims, 6 Drawing Sheets

PRESSURE EQUALIZING VALVE

BACKGROUND

1. Field of the Disclosure

The present disclosure relates in general to valves and more particularly, to gate valves for use with oil, gas and other fluids.

2. Description of Prior Art

A gate valve has a body with a flow passage extending through it. A gate cavity intersects the flow passage, and seat rings are located at the upstream and downstream points of intersection. An actuator, which may be mechanical, hydraulic or electrical, moves a gate within the cavity between open and dosed positions. The gate has an aperture through it next to the seal surface. When in the open position, the aperture registers with the flow passage. In the closed position, a seal surface on the gate contacts the downstream seat ring. The upstream pressure exerts a force pushing the seal surface into tight sealing engagement.

When the operator begins to open the gate valve from the closed position to the open position, the seal surface of the gale slides across the seat ring as the pie moves to the open position. The upstream pressure force continues to act on the gate until the aperture reaches the seat rings and the pressure across the gate equalizes. If the upstream pressure force is high, a considerable friction force results even if the seal surface and the seat rings are smooth surfaces and lubricants are employed. This frictional force can damage the seal surfaces of the seat ring and gate. A considerable amount of force wilt be required by rotational actuators to overcome the frictional forces and open the valve.

SUMMARY OF THE DISCLOSURE

Embodiments of the current disclosure provide a means for equalizing the pressure across the gate of a gate valve before the valve is opened. This decreases the friction forces on components of the valve and reduces the force required to open the valve. This reduces the wear on the components and increases the life of the valve.

A gate valve includes a body with a flow passage intersected by a gate cavity and a gate with an axis. The gate is axially movable in the gate cavity between a gate closed position and a gate open position. The gate valve has a lifting device in engagement with a stem of the gate to move the gate to the gate open position. A port extends from a first external surface of the gate to a second external surface of the gate. A seal member is mechanically connected to the lifting device, the seal member being moveable in response to axial movement of the lifting device between a seal closed position where the seal member blocks fluids from flowing through the port to a seal open position where fends can flow through the port in response to initial movement of the lifting device before the lifting device begins to move the gate.

In certain embodiments, there is a receptacle at an upper end of the gate, the receptacle having an upward facing bottom surface and a downward facing receptacle shoulder. The lifting device can have a lower downward facing surface, the distance between the lower downward facing surface and an upward facing flange shoulder of the lifting device being shorter than the distance between the downward facing receptacle shoulder and the upward facing bottom surface of the receptacle. This allows the lifting device to move upward axially within the receptacle to move the seal member, without moving the gate.

The lifting device can have a lower downward facing surface configured so that when the lower downward facing surface is in contact with the upward facing bottom surface of the receptacle, the seal member is in a seal closed position.

In other certain embodiments, the gate valve moves in an upward direction when opening and a downward direction when closing. The lilting device is moveable in a subsequent upward amount to cause upward facing flange shoulder of the lifting device to mate with the receptacle shoulder in move the gate in an upward direction.

The gate valve can have a downstream flat side and an upstream flat side. The first external surface of the gate can be the downstream flat side. The second external surface can be the bottom surface of the receptacle or the upstream flat side. The seal member can be a check valve, a poppet valve, or a shuttle valve.

In an alternative embodiment of the present disclosure, the gate valve has a body with a flow passage intersected by a gate cavity. The gate valve further includes a gate with an axis, the gate being axially movable in the gate cavity between a lower gate closed position and an upper gate open position. A port extends front a first external surface of the gate to a second external surface of the gate. A seal member is located in the port and moveable between a seal open position where fluids can flow through the port, and a seal closed position where the seal member blocks fluids from flowing through the port. A lifting device can be mechanically connected to the seal member. The lifting device is moveable in an initial upward amount to cause the seal member to move in an upward direction to a seal open position without causing movement of the gate. The lifting device is moveable in a subsequent upward amount to cause the gate to move in an upward direction.

In certain embodiments, the gate valve has a receptacle at an upper end of the gate, the receptacle having an upward facing bottom surface. The gate has a downstream flat side. The first external surface of the gate can be the downstream flat side and the second external surface can be the bottom surface of the receptacle. In such embodiment the seal member is a check valve. The check valve can have a connector with an external profile extending from the check valve. The lifting device can have an internal profile for mating with the external profile of the check valve to mechanically connect the lifting device to the check valve. The lifting device and check valve are restricted from relative movement in the direction of the gate axis but the lifting device can move in a direction generally normal to the gate axis relative to the check valve.

In certain other embodiments, a reverse port extends from an upstream flat side of the gate to the bottom surface of the receptacle, the reverse port having a reverse check valve located therein. The reverse check valve is moveable between a reverse seal open position where fluids can flow through the reverse port and a reverse seal closed position where the reverse check valve blocks fluids from flowing through the reverse port.

In yet other embodiments, the gate has a downstream flat side and an upstream flat side. The first external surface of the gate can be the downstream flat side, and the second external surface can be the upstream flat side. In this embodiment, the seal member can be a poppet valve or a shuttle valve. The poppet can be mechanically connected to the lifting device and movable axially within a cavity of the gate between the seal closed position where the poppet is located in the valve seat, and the seal open position where the poppet is located out of the valve seat. The shuttle valve can have an internal conduit extending therethrough and be mechanically connected to the lifting device and movable axially within a cavity of the gate between the seal closed position where the shuttle valve is located in the valve seat, and the seal open position where the shuttle valve is located out of the valve seat and there is fluid communication between the upstream branch and downstream branch of the port and the internal conduit of the shuttle valve.

In still other embodiments, the gate valve can have a receptacle at an upper end of the gate. The receptacle can have an upward facing bottom surface and a downward facing receptacle shoulder. The lifting device can have an upward facing flange shoulder for engaging the receptacle shoulder to move the gate to the gate open position. The lifting device can also have a lower downward facing surface, the distance between the lower downward facing surface and upward facing flange shoulder being shorter than the distance between the downward facing receptacle shoulder and the upward racing bottom surface of the receptacle, to allow the lifting device to move upward axially within the receptacle to move the seal member without moving the gate towards the gate open position.

In another alternative embodiment of the current disclosure, a gate valve has a body with a flow passage intersected by a gate cavity and a gate with an axis. The gate is axially movable in the gate cavity between a lower gate closed position and an upper gate open position. A receptacle is located at an upper end of the gate, the receptacle having a downward facing receptacle shoulder. The gate valve also includes a lifting device having an upward facing flange shoulder for engaging with the receptacle shoulder to move the gate to the gate open position. The lifting device is configured so that when the gate is in the gate closed position, an upper gap is located between the downward facing receptacle shoulder and the upward facing flange shoulder.

In certain embodiments, a port extends from a first external surface of the gate to a second external surface of the gate. A seal member is mechanically connected to the lifting device, the seal member being moveable by the stem to a seal open position where fluids can flow through the port when the lifting device moves upward a first distance into the gap and before the upward facing flange shoulder engages with the receptacle shoulder.

In other embodiments, the receptacle has an upward facing bottom surface and the lifting device has a lower downward facing surface. When the upward facing bottom surface of the receptacle is in contact with the lower downward facing surface of the lifting device, the seal member is in a seal closed position and fluids cannot flow through the port.

In still other embodiments, the gate has a downstream flat side and an upstream flat side and the first external surface of the gate is the downstream flat side. When the seal member is in the seal open position and the gate is in the gate closed position, fluids can flow from an upstream flat side of the gate to a downstream flat side of the gate through the port.

The receptacle can be configured so that when the lifting device moves upward beyond the first distance and the upward facing flange shoulder engages the receptacle shoulder and further upward movement of the fitting device will move the gate to the gate open position. The gate can include a valve seat. When the sealing member is in the seal closed position, a metal to metal seal can be formed between the valve seat and the sealing member.

BRIEF DESCRIPTION OF DRAWINGS

Some of the features and benefits of the present disclosure having been stated, others will become apparent as the description proceeds when taken in conjunction with the accompanying drawings, in which.

While the disclosure will be described in connection with the preferred embodiments, it will be understood that it is not intended to limit the disclosure to that embodiment. On the contrary, it is intended to cover all alternatives, modifications, and equivalents, as may be included within the spirit and scope of the disclosure as defined by the appended claims.

DETAILED DESCRIPTION OF DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
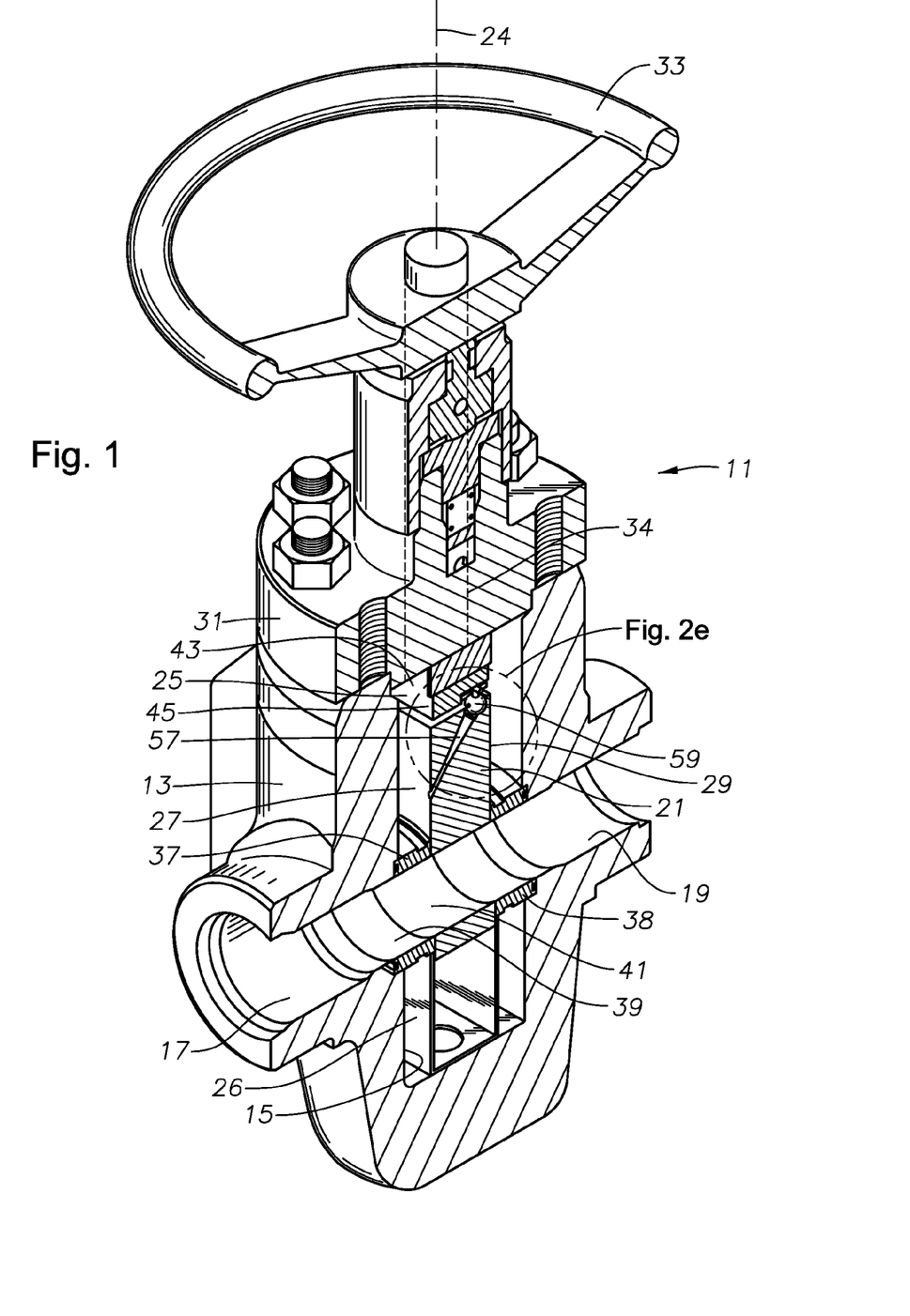
FIG. 1 is a partial sectional perspective view of a gate valve in a gate open position constructed in accordance with an embodiment of this disclosure.
Figure 2A:
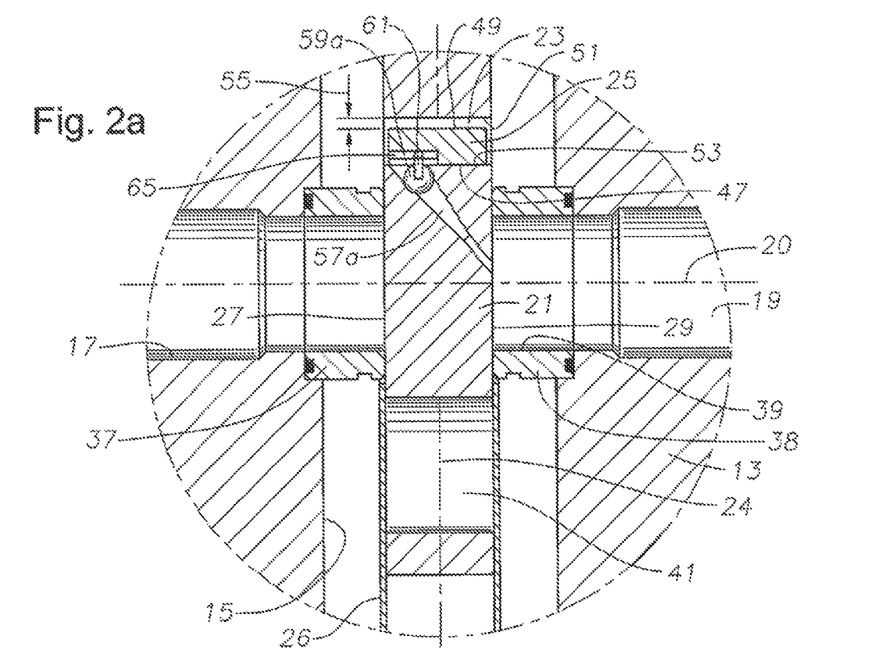
FIG. 2a is section view of the gate valve of FIG. 1 in the gate closed position and seal closed position.
Figure 2B:
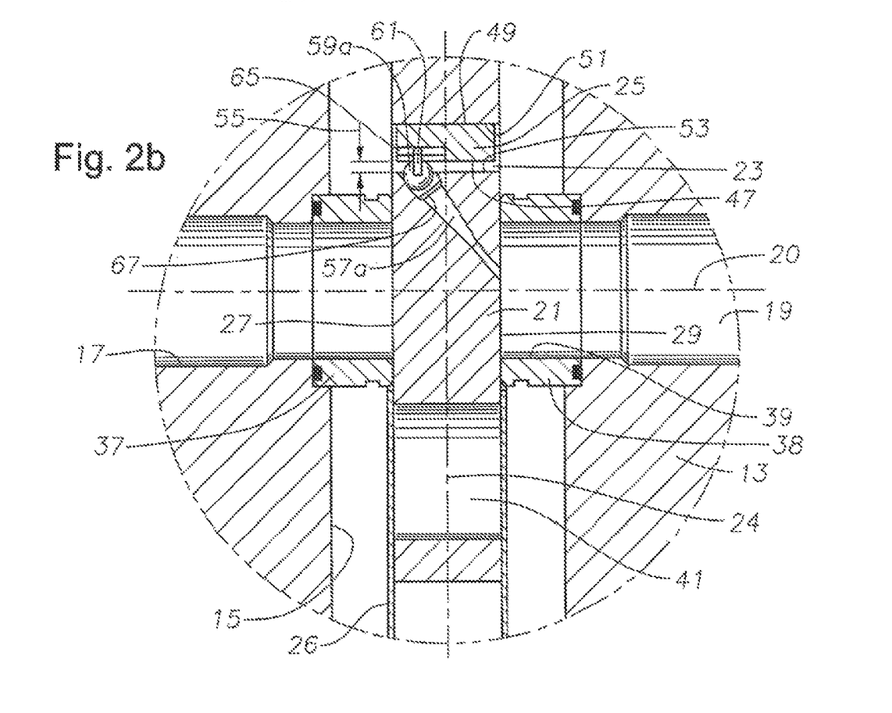
FIG. 2b is another section view of the gate valve of FIG. 1 in the gate closed position and seal open position.
Figure 2C:
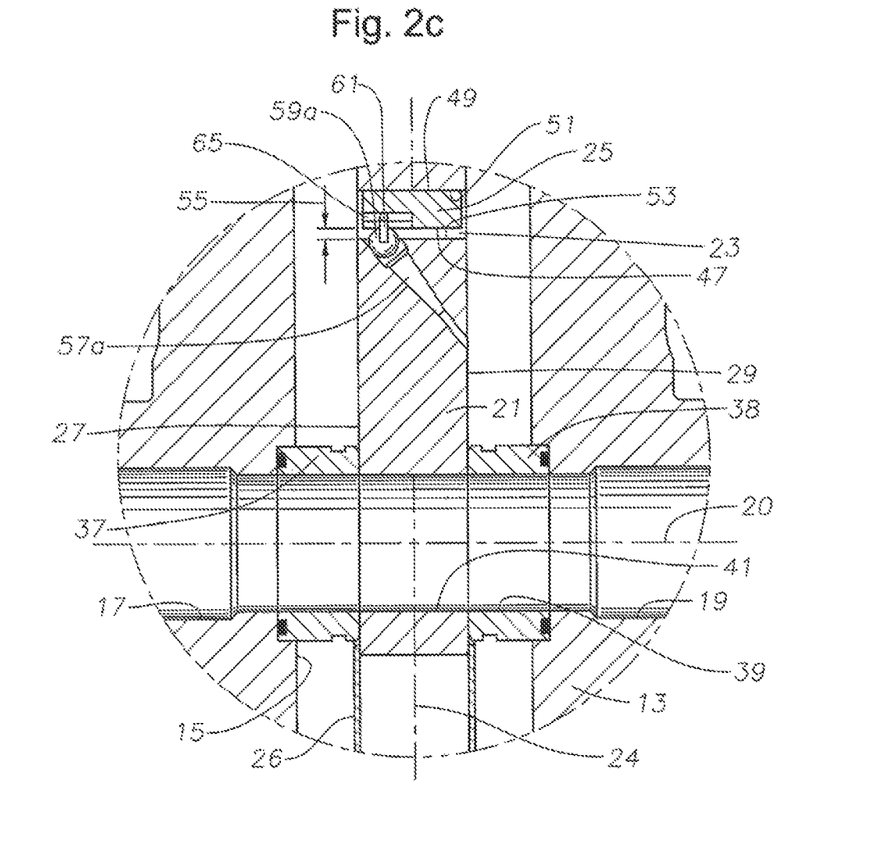
FIG. 2c is section view of the gate valve of FIG. 1 in the gate open position.

Referring to FIGS. 1 and 2a, valve 11 has a body 13 with a gate cavity 15 located therein. Valve 11 can be for example associated with a wellhead assembly that is disposed over a well. The wellhead assembly can include a wellhead housing, a production tree over the housing and flow lines connected to the tree or the wellhead assembly. The flow lines can include embodiments of valve 11 described herein. Valve 11 can also be used for regulating fluids, such as a fracturing fluid, that are designated for entry into the wellhead assembly. The wellhead assembly can be at surface or can be subsea.

A flow passage is defined by flow line passages 17, 19, which extend through body 13, are coaxial with each other about an axis 20 and intersect gate cavity 15. A gate 21 is carried within cavity 15 for movement in a plane perpendicular to axis 20 of flow line passages 17, 19. Gate 21 is generally rectangular, having upstream and downstream flat sides 27, 29. A skirt 26 located within cavity 15 will help maintain the correct orientation of gate 21. Depending on the direction of fluid flow, either flat side 27, 29 will be the upstream side. For purposes of this disclosure, flat side 27 will be described as the upstream side, however if the fluid flow was reversed, flat side 29 would be the upstream side. Although embodiments of this disclosure are described with fluid flow in one direction, it can be understood that embodiments of this disclosure can function equally with fluid flow in either direction.

Gate 21 can be moved by a rising stem, wherein the rising stem does not rotate, rather it moves linearly outward from body 13 along gate axis 24 as gate 21 is being lifted. Alternately, gate 21 could have a threaded nut on its upper end and be moved by a rotating non-rising stem. A bonnet 31 is mounted to the upper end of body 33. A hand wheel 33 is employed to cause the stem 34 to move linearly along gate axis 24. Alternately, a hydraulic or electric actuator could be utilized to cause axial movement of the stem 34. A stem seal located in bonnet 31 seals around the stem 34 and seals pressure within gate cavity 15.

A seat ring 37, 38 is mounted at the intersection of each flow passage 17, 19, respectively, with gate cavity 15. Seat rings 37, 38 have holes 39 therethrough and seal surfaces on their inward directed faces for sealing against the sides of gate 21. The distance between the seal surfaces of seat rings 37, 38 is slightly greater than the thickness of gate 21. Seat rings 37, 38 can be biased by springs toward each other.

Gate 21 can be a single slab type. Gate 21 has a flow passage or opening 41 that registers with flow passages 17, 19 and holes 39 in seat rings 37, 38 when the gate is in a fully gate open position. The inner diameter of gate opening 41 is typically the same as holes 39 in seat rings 37, 38 and flow passages 17, 19. In the gate closed position, the gate opening 41 is not aligned with the flow passages 17, 19 and the gate 21 instead blocks the flow passages 17, 19. When the gate 21 is in the gate closed position, the fluid forces on upstream flat side 27 will cause the downstream flat side 29 of gate 21 to seal against the seal surface of downstream seat ring 38. Because the distance between the seal surfaces of seat rings 37, 38 is slightly greater than the thickness of gate 21, upstream flat side 27 will not seal against the seal surface of seat ring 37 and fluids can escape through the gap between upstream flat side 27 and seat ring 37 and flow into cavity 15. The stem seal (not shown) will prevent fields from escaping from the gate cavity 15.

The stem 34 has a lifting device 25 on its lower end that fits within a receptacle 23 at the upper end of gate 21. Lifting device 25 can be, for example, a lifting device or other engagement member. Lifting device 25 has a generally upside-down "T" shaped cross section. The lifting device 25 has a vertical rib 43 that extends upward in the direction of gate axis 24 and is mechanically connected to the stem 34. The lifting device 25 has a horizontal nut flange 45 that is generally perpendicular to the vertical member 43. Lifting device 25 has a thickness that is no greater than, and preferably less than, the thickness of gate 21. The horizontal flange 45 has a lower downward facing surface 47 and an upward facing flange shoulder 49.

Receptacle 23 also has a generally upside-down "T" shaped cross section. Receptacle 23 includes downward facing receptacle shoulders 51 and an upward facing bottom surface 53. The distance between the lower downward facing surface 47 and upward facing flange shoulder 49 of flange 45 is shorter than the distance between the downward facing receptacle shoulders 51 and bottom surface 53 of receptacle 23. This results in a gap 55 within receptacle 23. Gap 55, or a portion thereof, can be located between the lower downward facing surface 47 of flange 45 and the bottom surface 53 of receptacle 23 (FIGS. 1, 2b, 2c, and 2e). Gap 55, or a portion, thereof, can also be located between, the downward facing receptacle shoulders 51 and upward facing flange shoulder 49 (FIG. 2a). The distribution of gap 55 will depend on valve 11 operations as will be discussed in further detail.

Figure 2D:
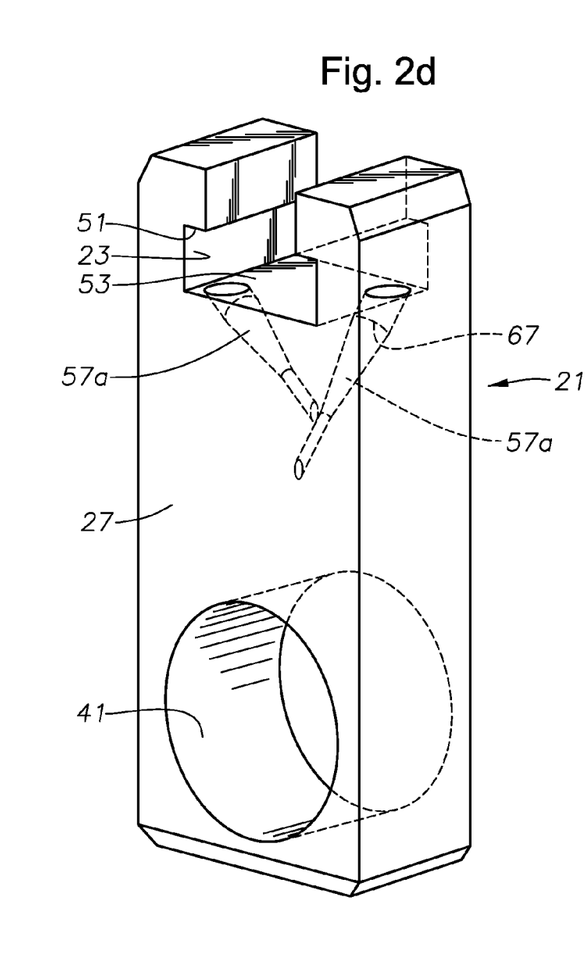
FIG. 2d is a perspective view of the gate of FIG. 1 with dotted lines illustrating internal components.
Figure 2E:
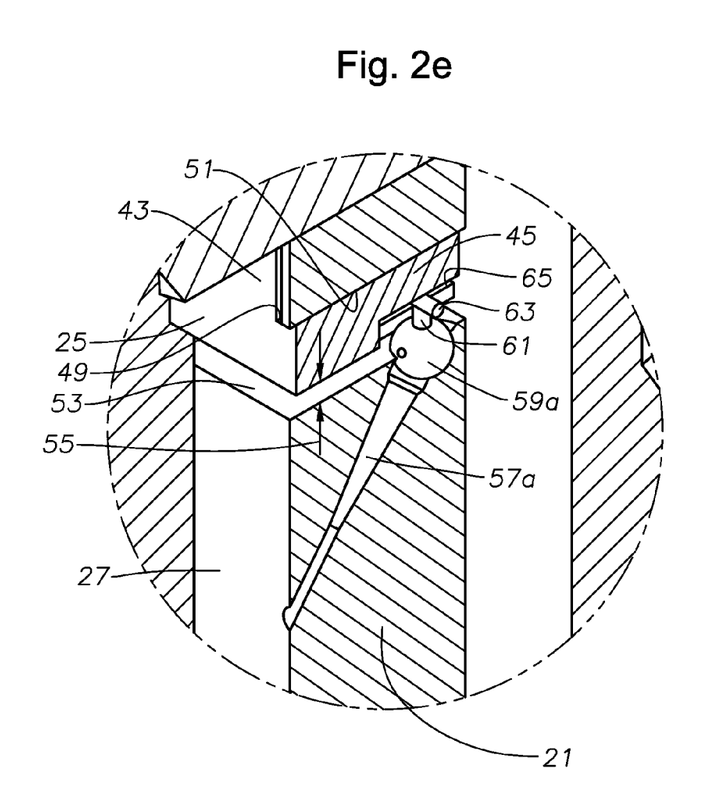
FIG. 2e is a perspective view of the encircled portion of the gate valve of FIG. 1.

Gate 21 has at least one pressure communication line or port 57 which extends from a first external surface of the gate to a second external surface of the gate. For example, port 57 can extend from the downstream flat side 29 to a bottom surface 53 of receptacle 23 (FIGS. 1-2e). Port 57 can alternatively extend from the downstream flat side 29 to the upstream flat side 27 (FIGS. 3a-4b). Various embodiments of port 57 are shown as ports 57a, 57b, and 57c in FIGS. 1-4b. Turning to FIG. 2d, gate 21 can have 2 ports 57a which are offset on either side of axis 24. One such port 57a has an open end on downstream flat side 29. The reverse port 57a has an open end on upstream flat side 27 and will contain all of the same components of port 57a. This will allow the valve 11 to operate in the same manner regardless of the direction of fluid flow.

Returning to FIGS. 1 and 2a, a seal member 59 can seal port 57 when the gate 21 is in the gate closed position. Various embodiments of seal member 59 are shown as seal member 59a, 59b, and 59c in FIGS. 1-4b. Seal member 59 is mechanically connected to lifting device 25 and can be moved between a seal open position and a seal closed position with upward and downward movement of the lifting device 25. When gap 55 is located between the lower downward facing surface 47 of flange 45 and the bottom surface 53 of receptacle 23, seal member 59 is in the seal open position and fluid can travel through port 57 (FIGS. 1, 2b, 2c, and 2e, 3b, 4b). When gap 55 is located between the downward facing receptacle shoulders 51 and upward facing flange shoulder 49, downward facing surface 47 of lifting device 25 contacts the bottom surface 53 of receptacle 23. In this configuration, seal member 59 seals ports 57 and fluids cannot flow through port 57 (FIGS. 2a, 3a, and 4a).

Turning to FIG. 2e, in one embodiment of the current disclosure, seal member 59a is a check valve, such as a ball check valve. A seal connector 61 extends from the check valve. Connector 61 has an external profile 63 at a distal end. An internal profile or groove 65 is located within lifting device 25. The external profile 63 of the connector 61 mates with the internal groove 65 of lifting device 25. Connector 61 creates a mechanical connection between seal member 59a and lifting device 25 so that there is no relative vertical movement between seal member 59a and lifting device 25. Therefore as lifting device 25 moves up and down along axis 24 (FIG. 1), seal member 59a also moves along axis 24 a corresponding amount. The internal groove 65 can extend in a direction parallel to axis 20, allowing the external profile 63 to travel along the internal groove 65. Therefore lifting device 25 can move in a direction generally normal to the gate axis 24 relative to the check valve.

Port 57a extends from the downstream flat side 29 of gate 21 to a bottom surface 53 of receptacle 23. A check valve seat 67 is located at an end of port 57a proximal to the bottom surface 53 of receptacle 23. When check valve seal member 59a is in the seal closed position and seated in check valve seat 67, a metal to metal seal is formed between the outer surface of check valve seal member 59a and the inner profile of check valve seat 67. When check valve seal member 59 is raised out of check valve seat 67 and into the seal open position, fluid can flow through or past check valve seal member 59, through port 57a and exit port 57a at the downstream flat side 29 of gate 21. Because the distance between the seal surfaces of seat rings 37, 38 is slightly greater than the thickness of gate 21, upstream flat side 27 will not seal against the seal surface of seat hug 37 and fluids can escape through the gap between upstream flat side 27 and seat ring 37. These fluids will enter gap 55 and reach the opening of port 57a proximal to the bottom surface 53 of receptacle 23. In this way, fluids in flow line passage 17, on the upstream flat side 27 of gate 21 will flow through port 57a to the downstream flat side 29 of gate 21 and into low line passage 19 when check valve seal member 59a is open.

Figure 3A:
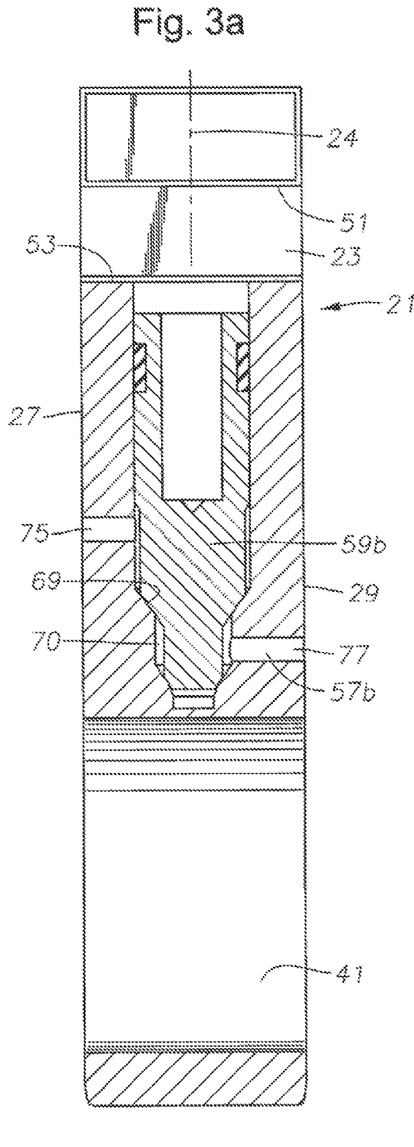
FIG. 3a is a section view of an alternative gate in the seal closed position in accordance with an embodiment of this disclosure.
Figure 3B:
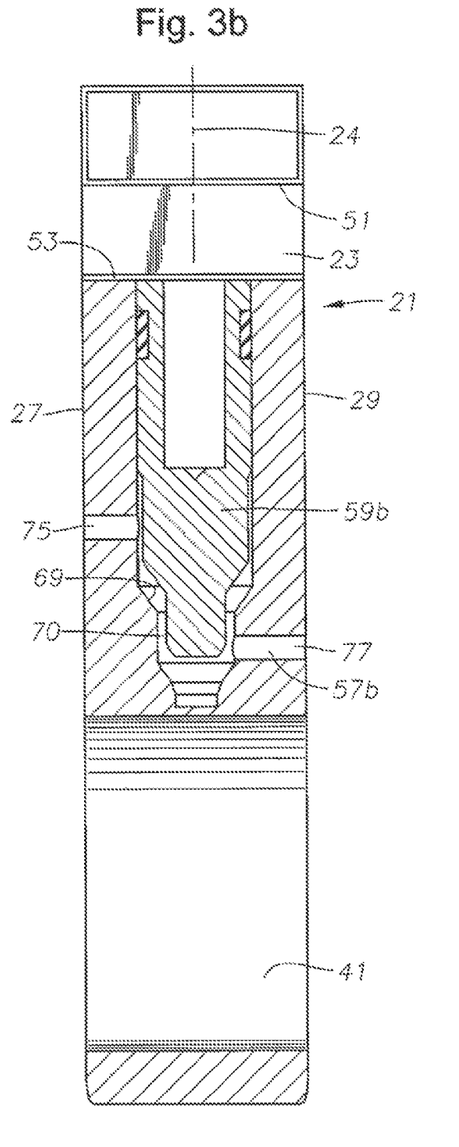
FIG. 3b is a section view of the gate of FIG. 3a in the seal open position.
Figure 4A:
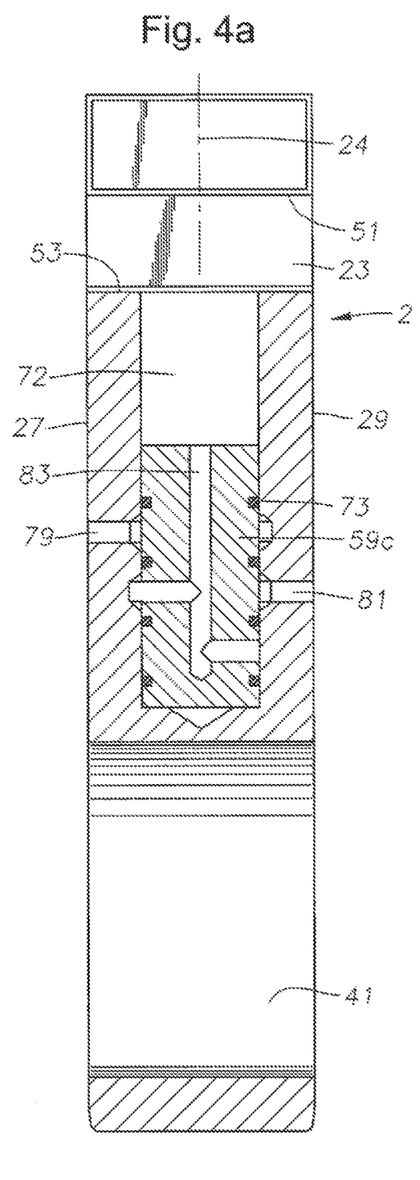
FIG. 4a is a section view of an alternative gate in the seal closed position in accordance with an embodiment of this disclosure.

Turning to FIGS. 3a-3b, in alternative embodiments, seal member 59b can be a poppet valve and port 57b can include a poppet seat 69. Poppet seat 69 is a valve seat and will have an internal profile that mates with an external profile of poppet seal member 59b, so that when poppet seal member 59b is in the seal closed position and seated within poppet seat 69, a metal to metal seal exists between the internal profile of the poppet seat 69 and the external profile of poppet seal member 59b. Port 57b extends from the downstream flat side 29 to the upstream flat side 27 of gate 21. Port 57b has an upstream leg 75 and a downstream leg 77 which intersect at a central cavity 70 of the port 57b. The upstream leg 75 of port 57b intersects central cavity 70 above poppet seat 69 and the downstream leg 77 of port 57b intersects the central cavity 70 below poppet seat 69. Poppet seal member 59b is mechanically attached to lifting device 25. When poppet seal member 59b is lifted oat of poppet seat 69 and into the seal open position, field in flow line passage 17 can flow from the upstream flat side 27 of gate 21, into the upstream leg 75 of port 57b, through the port 77c and into the downstream leg 77 of port 57b, exit port 57b at the downstream flat side 29 of gate 21 and flow into flow line passage 19.

Figure 4B:
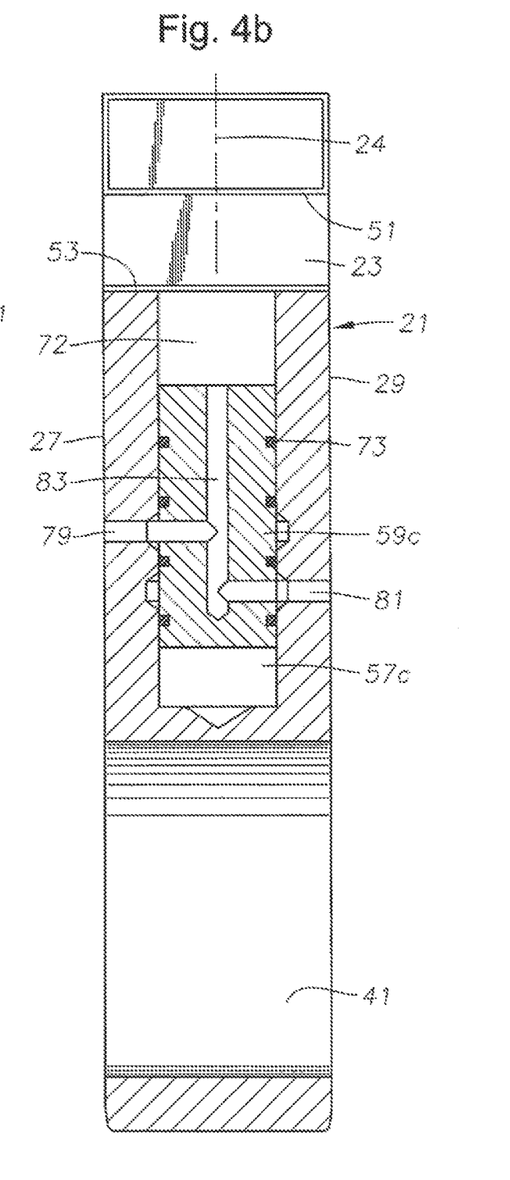
FIG. 4b is a section view of the gate of FIG. 4a in the seal open position.

Turning to FIGS. 4a-4b, in alternative embodiments, seal member 59c can be a shuttle valve and port 57c can include a valve seat such as shuttle seat 71. Shuttle seal member 59c can include a plurality of circumferential sealing members 73, such as elastomeric o-rings, to fluidly seal the space between the internal surface of the shuttle seat 71 and the external surface of shuttle seal member 59c. Port 57c includes an upstream leg and a downstream leg which intersect at a shuttle cavity 72. Port 57c has an upstream branch 79 and a downstream branch 81 which are spaced apart axially. Shuttle valve 59c has internal conduit 83, including a vertical conduit and two laterally extending conduits axially offset from each other to align with the upstream and downstream branches 79, 81 of port 57c. When shuttle seal member 59c is in the seal closed position, circumferential sealing members 73 prevent fluid from flowing through port 57c. Port 57c extends from the downstream flat side 29 to the upstream flat side 27 of gate 21. Shuttle seal member 59c is mechanically attached to lifting device 25. When shuttle seal member 59c is lifted out of shuttle seat 71 and into the seal open position, the upstream and downstream branches 79, 81 of port 57c are in fluid communication with the internal conduit 83 of shuttle seal member 59c. Therefore, fluid in flow line passage 17 can flow from the upstream flat side 27 of gate 21, into the upstream branch 79 of port 57c, through the internal conduit 83 of shuttle seal member 59c, through the downstream branch 81 of port 57c and exit port 57c at the downstream flat side 29 of gate 21 and flow into flow line passage 19.

Returning to FIGS. 1-2a, in operation, when the operator desires to move gate 21 from a gate closed position to a gate open position, the operator can first move lifting device 25 upwards a first distance. This can be accomplished by, for example turning hand wheel 33. Lifting device 25 will move into gap 55 but by moving the upward the first distance, upward facing flange shoulder 49 does not fully engage the receptacle shoulder 51. Due to the lost motion arrangement gate 21 does not begin to move when lifting device 25 moves to the first distance. By moving upward the first distance, lifting device 25 will move seal member 59 from a seal closed position to a seal open position. This will allow fluids to flow from an upstream flat side 27 of gate 21 to a downstream list side 29 of gate 21 through the port 57 while gate 21 remains in a gate closed position. As the fluids flow from upstream flat side 27 of gate 21 to a downstream flat side 29 of gate 21, the pressure differential across gate 21 will be equalized. The operator can then move lifting device 25 upwards past the first distance so that upward facing flange shoulder 49 engages the receptacle shoulder 51. Any additional upward movement of lifting device 25 will cause gate 21 to move towards a gate open position.

The gate valve described herein has significant advantages. By equalizing the pressure across gate 21 before the gate 21 is moved to the gate open position, the friction forces on the components of the valve and the force required to open the valve are both reduced. This will reduce the wear on the components and increase the life of the valve.

The terms "vertical", "horizontal", "upward", "downward", "above", and "below" are used herein only for convenience because valve 11 may be installed in various positions, other than with the stem 34 pointing upward.

The present disclosure described herein, therefore, is well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure disclosed herein and the scope of the appended claims.

What is claimed is:

1. A gate valve, comprising:
    a body with a flow passage intersected by a gate cavity;
    a gate with an axis, the gate being axially movable in the gate cavity between a gate closed position and a gate open position;
    a lifting device in engagement with a stem of the gate to move the gate to the gate open position;
    a port extending from a first external surface of the gate to a second external surface of the gate; and
    a fluid pressure energized seal member mechanically connected to the lifting device, the seal member oriented to be retained in the seal closed position by a fluid pressure of a fluid in the flow passage that is upstream of a downstream side of the gate and being moveable in response to axial movement of the lifting device from a seal closed position where the seal member forms a non-elastomeric seal and blocks fluids from flowing through the port, to a seal open position where fluids can flow through the port, in response to initial movement of the lifting device overcoming the fluid pressure acting on the seal member, before the lifting device begins to move the gate.

2. The gate valve of claim 1, further comprising a receptacle at an upper end of the gate, the receptacle having an upward facing bottom surface and a downward facing receptacle shoulder, and wherein the lifting device has a lower downward facing surface and an upward facing flange shoulder, the distance between the lower downward facing surface and the upward facing flange shoulder being shorter than the distance between the downward facing receptacle shoulder and the upward facing bottom surface of the receptacle, to allow the lifting device to move upward axially within the receptacle to move the seal member without moving the gate.

3. The gate valve of claim 1, further comprising a receptacle at an upper end of the gate, the receptacle having an upward facing bottom surface and wherein the lifting device has a lower downward facing surface configured so that when the lower downward facing surface is in contact with the upward facing bottom surface of the receptacle, the seal member is operable to be in the seal closed position.

4. The gate valve of claim 1, wherein:
the gate moves in an upward direction when opening and a downward direction when closing; and
the lifting device is moveable in a subsequent upward amount to move the gate in an upward direction.

5. The gate valve of claim 1, wherein:
the gate valve has a receptacle at an upper end of the gate, the receptacle having an upward facing bottom surface;
the gate has a downstream flat side;
the first external surface of the gate comprises the downstream flat side; and
the second external surface of the gate comprises the bottom surface of the receptacle.

6. The gate valve of claim 1, wherein, the gate has an upstream flat side and a receptacle with an upward facing bottom surface, the gate valve further comprising a reverse port extending from an upstream flat side of the gate to the bottom surface of the receptacle.

7. The gate valve of claim 1, wherein:
the gate has a downstream flat side and an upstream flat side;
the first external surface of the gate comprises the downstream flat side; and
the second external surface comprises the upstream flat side.

8. The gate valve of claim 1, wherein the seal member is a valve selected from a group consisting of a spherical seating valve, a poppet valve, and a shuttle valve.

9. A gate valve, comprising:
a body with a flow passage intersected by a gate cavity;
a gate with an axis, the gate being axially movable in the gate cavity between a lower gate closed position and an upper gate open position;
a port extending from a first external surface of the gate to a second external surface of the gate;
a fluid pressure energized seal member located in the port and oriented to be retained in a seal closed position where the seal member forms a non-elastomeric seal and blocks fluids from flowing through the port by a fluid pressure of a fluid in the flow passage that is upstream of a downstream side of the gate, the seal member moveable between a seal open position where fluids can flow through the port and the seal closed position; and
a lifting device mechanically connected to the seal member, wherein: the lifting device is moveable in an initial upward amount to overcome the fluid pressure acting on the seal member and cause the seal member to move in an upward direction to a seal open position without causing movement of the gate; and the lifting device is moveable in a subsequent upward amount to cause the gate to move in an upward direction.

10. The gate valve of claim 9, wherein:
the gate valve has a receptacle at an upper end of the gate, the receptacle having an upward facing bottom surface;
the gate has a downstream flat side;
the first external surface of the gate comprises the downstream flat side;
the second external surface comprises the bottom surface of the receptacle; and
the seal member is a spherical seating valve.

11. The gate valve of claim 9, wherein:
the seal member is a spherical seating valve, the spherical seating valve having a connector extending from the spherical seating valve with an external profile; and
the lifting device has an internal profile for mating with the external profile of the connector to mechanically connect the lifting device to the seal member such that the lifting device and spherical seating valve are restricted from relative movement in the direction of the gate axis and the lifting device can move in a direction generally normal to the gate axis relative to the spherical seating valve.

12. The gate valve of claim 9, further comprising:
a receptacle at an upper end of the gate, the receptacle having an upward facing bottom surface; and
a reverse port extending from an upstream flat side of the gate to the bottom surface of the receptacle, the reverse port having a reverse spherical seating valve located therein, the reverse spherical seating valve being moveable between a reverse seal open position where fluids can flow through the reverse port and a reverse seal closed position where the reverse spherical seating valve blocks fluids from flowing through the reverse port.

13. The gate valve of claim 9, wherein:
the gate has a downstream flat side and an upstream flat side;
the first external surface of the gate comprises the downstream flat side;
the second external surface comprises the upstream flat side;
the port includes an upstream leg and a downstream leg and a valve seat; and
the seal member is a poppet valve, the poppet being mechanically connected to the lifting device and movable axially within a central cavity of the gate between the seal closed position where the poppet is located in the valve seat, and the seal open position where the poppet is located out of the valve seat.

14. The gate valve of claim 9, wherein:
the gate has a downstream flat side and an upstream flat side;
the first external surface of the gate comprises the downstream flat side;
the second external surface comprises the upstream flat side;
the port includes an upstream branch and a downstream branch a valve seat; and
the seal member is a shuttle valve, the shuttle valve having an internal conduit extending therethrough, the shuttle valve being mechanically connected to the lifting device and movable axially within a shuttle cavity of the gate between the seal closed position where the shuttle valve is located in the valve seat, and the seal open position where the shuttle valve is located out of the valve seat and there is fluid communication between the upstream branch and the downstream branch of the port and the internal conduit of the shuttle valve.

15. The gate valve of claim 9, further comprising:
a receptacle at an upper end of the gate, the receptacle having an upward facing bottom surface and a downward facing receptacle shoulder; and wherein the lifting device has an upward facing flange shoulder for engaging the receptacle shoulder to move the gate to the gate open position.

16. The gate valve of claim 9, further comprising:

a receptacle at an upper end of the gate, the receptacle having an upward facing bottom surface and a downward facing receptacle shoulder; and wherein the lifting device has an upward facing flange shoulder and a lower downward facing surface, wherein the distance between the lower downward facing surface and the upward facing flange shoulder is shorter than the distance between the downward facing receptacle shoulder and the upward facing bottom surface of the receptacle, to allow the lifting device to move upward axially within the receptacle to move the seal member without moving the gate towards the gate open position.

17. A gate valve, comprising:

a body with a flow passage intersected by a gate cavity;

a gate with an axis, the gate being axially movable in the gate cavity between a lower gate closed position and an upper gate open position;

a receptacle at an upper end of the gate, the receptacle having a downward facing receptacle shoulder;

a lifting device having an upward facing flange shoulder for engaging with the receptacle shoulder to move the gate to the gate open position, the lifting device configured so that when the gate is in the gate closed position, an upper gap is located between the downward facing receptacle shoulder and the upward facing flange shoulder;

a port extending from a first external surface of the gate to a second external surface of the gate; and a fluid pressure energized seal member mechanically connected to the lifting device, the seal member oriented to be retained in a seal closed position forming a non-elastomeric seal by a fluid pressure of a fluid in the flow passage that is upstream of a downstream side of the gate, the seal member being moveable by the stem to a seal open position where fluids can flow through the port when the lifting device overcomes the fluid pressure acting on the seal member and moves upward a first distance into the gap and before the upward facing flange shoulder engages with the receptacle shoulder.

18. The gate valve of claim 17, wherein:

the receptacle has an upward facing bottom surface;

the lifting device has a lower downward facing surface configured so that when the upward facing bottom surface of the receptacle is in contact with the lower downward facing surface of the lifting device, the seal member is operable to be in a seal closed position and fluids cannot flow through the port.

19. The gate valve of claim 17, wherein:

the gate has a downstream flat side and an upstream flat side;

the first external surface of the gate comprises the downstream flat side; and wherein when the seal member is in the seal open position and the gate in the gate closed position, fluids can flow from an upstream flat side of the gate to a downstream flat side of the gate through the port.

20. The gate valve of claim 17, wherein the receptacle is configured so that when the lifting device moves upward beyond the first distance and the upward facing flange shoulder engages the receptacle shoulder, further upward movement of the lifting device will move the gate to the gate open position.

* * * * *